United States Patent [19]
Domka

[11] Patent Number: 5,803,944
[45] Date of Patent: Sep. 8, 1998

[54] LATHE FOR BLOWING GLASS

[76] Inventor: Robert Domka, 6412 Brace, Detroit, Mich. 48228

[21] Appl. No.: 824,505

[22] Filed: Mar. 26, 1997

[51] Int. Cl.⁶ .................................. C03B 9/00; B23B 3/00
[52] U.S. Cl. .................................. 65/300; 65/301; 65/355; 65/375; 65/109; 82/117
[58] Field of Search ............................. 65/300, 301, 228, 65/276, 292, 355, 370.1, 375, 35, 63, 64, 66, 109, 110; 82/117

[56] References Cited

U.S. PATENT DOCUMENTS

| | | |
|---|---|---|
| 740,455 | 10/1903 | Moon . |
| 1,788,927 | 1/1931 | Millar . |
| 1,788,954 | 1/1931 | Mailey et al. . |
| 2,818,683 | 1/1958 | Nieman et al. . |
| 3,607,204 | 9/1971 | Gilbertson, Jr. . |

*Primary Examiner*—Steven P. Griffin
*Attorney, Agent, or Firm*—MacMillan, Sobanski & Todd, LLC

[57] ABSTRACT

A lathe for blowing glass. The lathe includes a lower section and an upper section removably attached to the lower section to form a housing. A motor is operably connected to a gear assembly. At least one roller assembly rotatably supports a blowpipe. An air coupling assembly rotatably attached to the gear assembly allows air to pass from a blowhose to an air tube frictionally engaging the blowpipe. A sprinkler system may be provided for cooling the blowpipe while the article is being formed. The speed and direction of rotation of the blowpipe can be manually or remotely controlled by the glassmaker. Thus, the lathe is capable of rotating the blowpipe while air is being provided to the blowpipe to form the article.

23 Claims, 3 Drawing Sheets

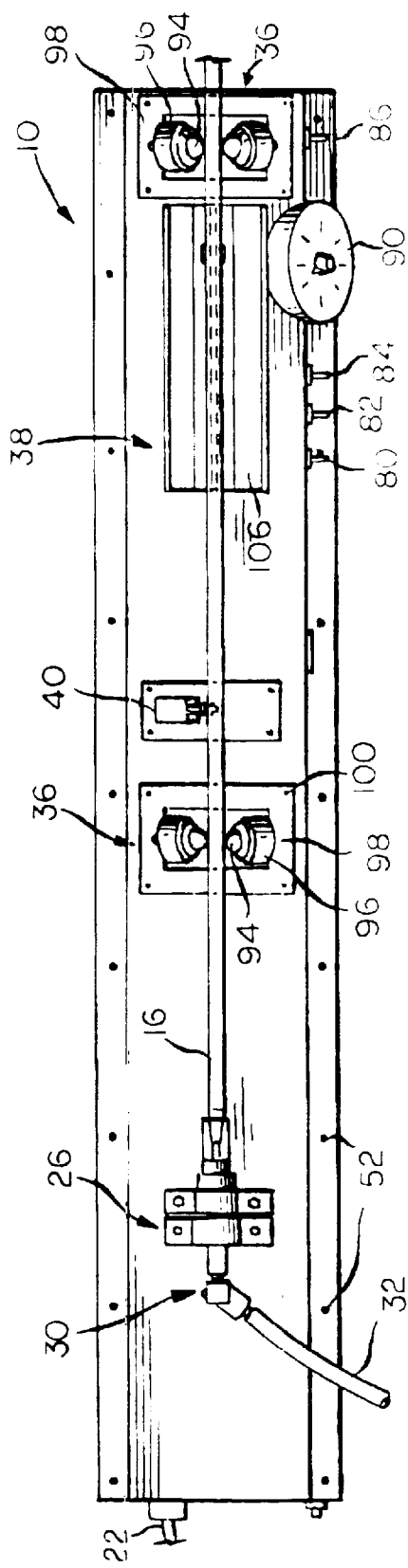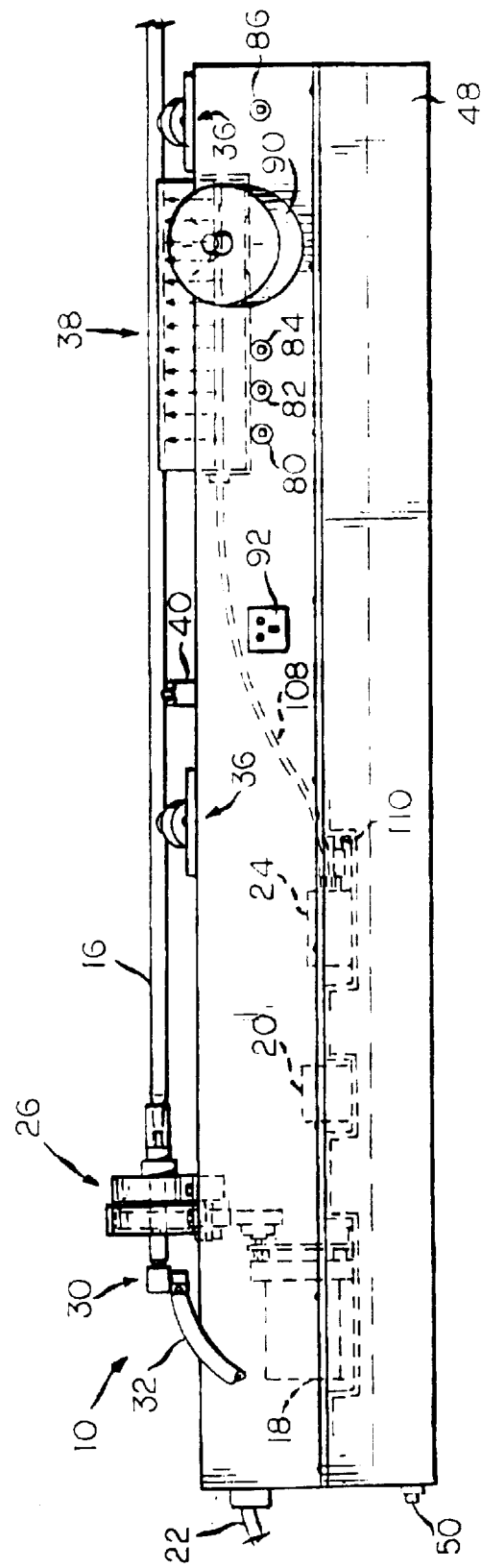

LATHE FOR BLOWING GLASS

BACKGROUND OF THE INVENTION

1. Field of the Invention

The invention relates in general to an apparatus for blowing glass, and in particular to a lathe for blowing glass that allows the glassblower to form the article while the article is being rotated by the lathe.

2. Related Art

Just when man discovered the process of making glass is not known. According to legend, glass was produced by accident along a sandy shore of a tidal river in Syria when men, huddled around a fire while preparing food, accidentally fused the sand and lumps of natron (soda) used to support the cooking pot.

Archaeologists' discoveries indicate that the making of glass started around 6,000 years ago as a crude coating for pottery. Glassmaking became a staple of Egyptian and Syrian industries at least 3,500 years ago. They would wind layer after layer of long thin strips of molten glass around molds formed of sand. When the sand was dumped out the hollow glass object remained.

Some time during the first century B.C., a discovery was made in Syria which was to change glassmaking completely. The metal rod which held the sand core was hollowed out to make it lighter and also to make the heat more bearable. Then a Syrian glassblower blew down the center of the rod, and so glassblowing was invented.

The invention of the blowpipe made possible quantity production of glass articles in shapes and designs previously impossible to achieve. The blowpipe in essentially the same form was to remain for almost two thousand years as the productive instrument with which increasingly skilled artisans explored and expanded the true capabilities of glass.

From the beginning of glassmaking until the last quarter of the nineteenth century, all glass was formed by hand. In the hand-blown method, a gob of molten glass is gathered from a large melting pot onto the end of an iron blowpipe. After the blower has blown a small "bubble" inside the glass, the "gather" of glass is rolled onto a smooth slab ("marvered") to chill its outside. The glass is then blown while the blowpipe is constantly rotated to make sure that the shape does not go out of round.

When the base of the article has been shaped, a solid iron rod called the "pontil" is attached to it with a small amount of molten glass. After reheating in a part of the furnace called the "glory hole", the top of the article is sheared off and finally shaped. When the article has been completed to the glassblower's satisfaction, the pontil is cracked off, and the article is taken away to the annealing lehr, where all the internal stresses are relieved.

The size, shape, and wall thickness of this hollow mass can be controlled by the air the glassblower forces into it, the angle at which he holds the pipe, and the degree to which he allows the glass to cool. To keep the partly-finished piece pliable, it may be reheated a number of times in a small furnace to ensure easy working.

From the beginning of glassmaking, the glassblower would continuously rotate the blowpipe by hand while blowing into the blowpipe to form the article. Continuously rotating the blowpipe ensures that the shape of the article would not go out of round. Because the glassblower's hands were being used to continuously rotate the blowpipe, it was not possible for the glassblower to use tools for shaping, trimming or cutting while blowing into the blowpipe to form the article. Enabling the glassblower to use tools while the article is being rotated and blown would allow the glassmaker to form the article in a much shorter period of time. Further, the glassmaker would be able to create article designs that were not possible using conventional glassblowing techniques.

SUMMARY OF THE INVENTION

It is an object of the invention to provide an apparatus that rotates the blowpipe for the glassblower while the article is being formed.

It is another object of the invention to provide a an apparatus for glass blowing that enables a glassblower to use tools while the blowpipe is being rotated.

It is yet another object of the invention to provide an apparatus that allows the glassblower to blow into the blowpipe to form the article while using tools.

It is further object of the invention to provide an apparatus for glass blowing that allows the glassblower to select a speed of rotation of the blowpipe.

It is another object of the invention to provide an apparatus that allows the glassblower to remotely control the rotation of the blowpipe.

It is yet another object of the invention to provide an apparatus for glass blowing that allows the glassblower to select a direction of rotation of the blowpipe.

It is still yet another object of the invention to provide an apparatus for glass blowing that provides cooling of the blowpipe while the article is being formed by the glassmaker.

To achieve these and other objects of the invention, a lathe for blowing glass comprises a lower section and an upper section removably attached to the lower section. A motor, transformer and pump are mounted on the lower section of the lathe. The motor is capable of rotating the blowpipe in a forward and reverse direction. A gear assembly is coupled to the output shaft of the motor. An air coupling assembly having an input and an output, is rotatably attached to the gear assembly so as to be rotated by the gear assembly. A blow hose is connected to the input of the air coupling assembly. An air tube is connected to the output of the air coupling assembly and is capable of frictionally engaging the blowpipe. At least one pair of rollers are mounted on the upper section for rotatably supporting the blowpipe. A fluid reservoir located in the lower section for containing cooling fluid and a pump mounted in the reservoir in fluid communication with the cooling fluid. A sprinkler system including a plurality of outlets for supplying cooling fluid to the blowpipe may be in fluid communication with the pump. A remote control unit may be operably connected to the motor for remotely controlling the speed of rotation of the blowpipe.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which:

FIG. 2 shows a top view of the lathe of FIG. 1;

FIG. 3 shows a side view of the lathe of FIG. 1; and

DETAILED DESCRIPTION OF THE PREFERRED EMBODIMENTS

Figure 1:
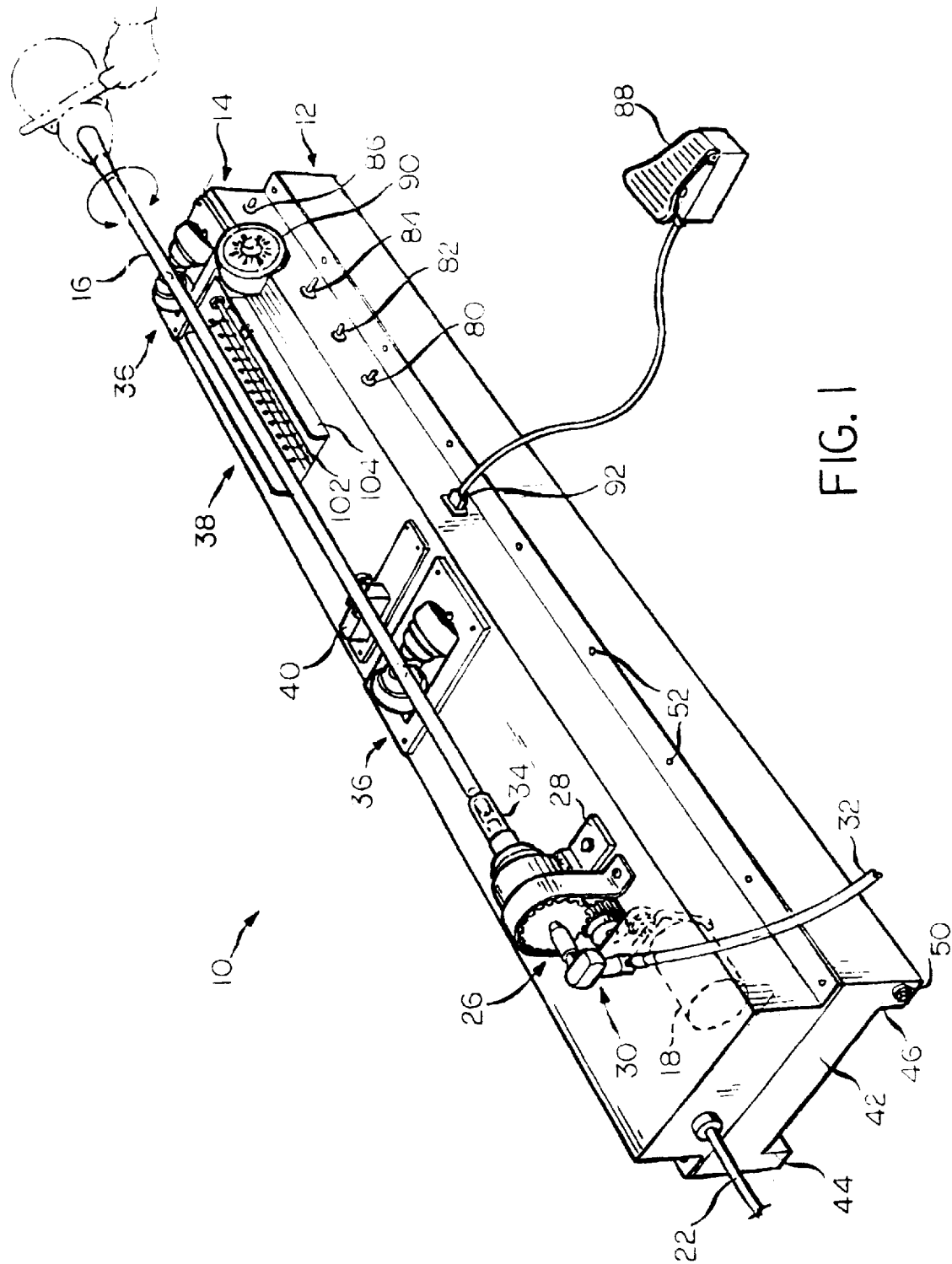
FIG. 1 shows a perspective view of the lathe for blowing glass according to a preferred embodiment of the invention.

FIGS. 1–3 show a lathe 10 for blowing glass according to a preferred embodiment of the invention.

In general, the lathe 10 comprises a lower section 12 and an upper section 14 removably attached to the lower section to form an external housing of the lathe 10. A means for rotating a blowpipe 16, preferably a motor 18 is mounted to the lower section 12. A transformer 20, preferably a 12 volt Class 2 transformer well-known in the art, providing electrical energy from a power supply 22 to the motor 18 may be mounted to the lower section 12. In addition, a means for providing cooling fluid, preferably a pump 24 may be mounted to the lower section 12 of the lathe 10. A gear assembly 26 allows the motor 18 to rotate the blowpipe 16 in a forward and reverse direction and at a rotational speed selected by the glassmaker. A gear support 28 is provided to support the gear assembly 26. An air coupling assembly 30 having an input and an output is rotatably attached to the gear assembly 26. A blow hose 32 is connected to the input of the air coupling assembly 30 for allowing the glassblower to blow air into the air coupling assembly 30 through the gear assembly 26 and into the blowpipe 16. An air tube 34 is connected to the output of the air coupling assembly 30 and frictionally engages the blowpipe 16. At least one roller assembly 36 rotatably support the blowpipe 16 on the upper section 14 of the lathe 10. A sprinkler system 38 provides a means for cooling the blowpipe 16 while the glassmaker forms the article. The sprinkler system 38 may be activated by a switch 40 located on the upper section 14 of the lathe 10 and connected to the pump 24.

Referring now to FIGS. 1–3, the lower section 12 has a generally U-shaped configuration forming a middle portion 42 and leg portions 44, 46 for supporting the lathe 10. The lower section 12 is preferably made of aluminum or other lightweight, sturdy material, such as plastic and the like, with a thickness of approximately 0.125 inches. The lower section 12 is hollow so as to form a reservoir 48 for holding a cooling fluid (not shown), preferably water. A drain plug 50 is provided in one of the leg portions 46 to allow the user to drain the cooling fluid from the lower section 12. It should be understood that another drain plug (not shown) may be located in the other leg portion 44 to increase the flow rate of the cooling fluid leaving from the lower section 12 of the lathe 10.

The lower section 12 includes a plurality of openings 52 and the upper section 14 includes a like number of openings 52 in alignment with the openings of the lower section 12. In this manner, the lower section 12 and upper section 14 may be removably attached by using a well-known fastening means, such as screws, bolts and the like. It should be understood that the upper section 14 may also be made of aluminum or other lightweight, sturdy material, such as plastic and the like, with a thickness of approximately 0.125 inches.

Figure 4:
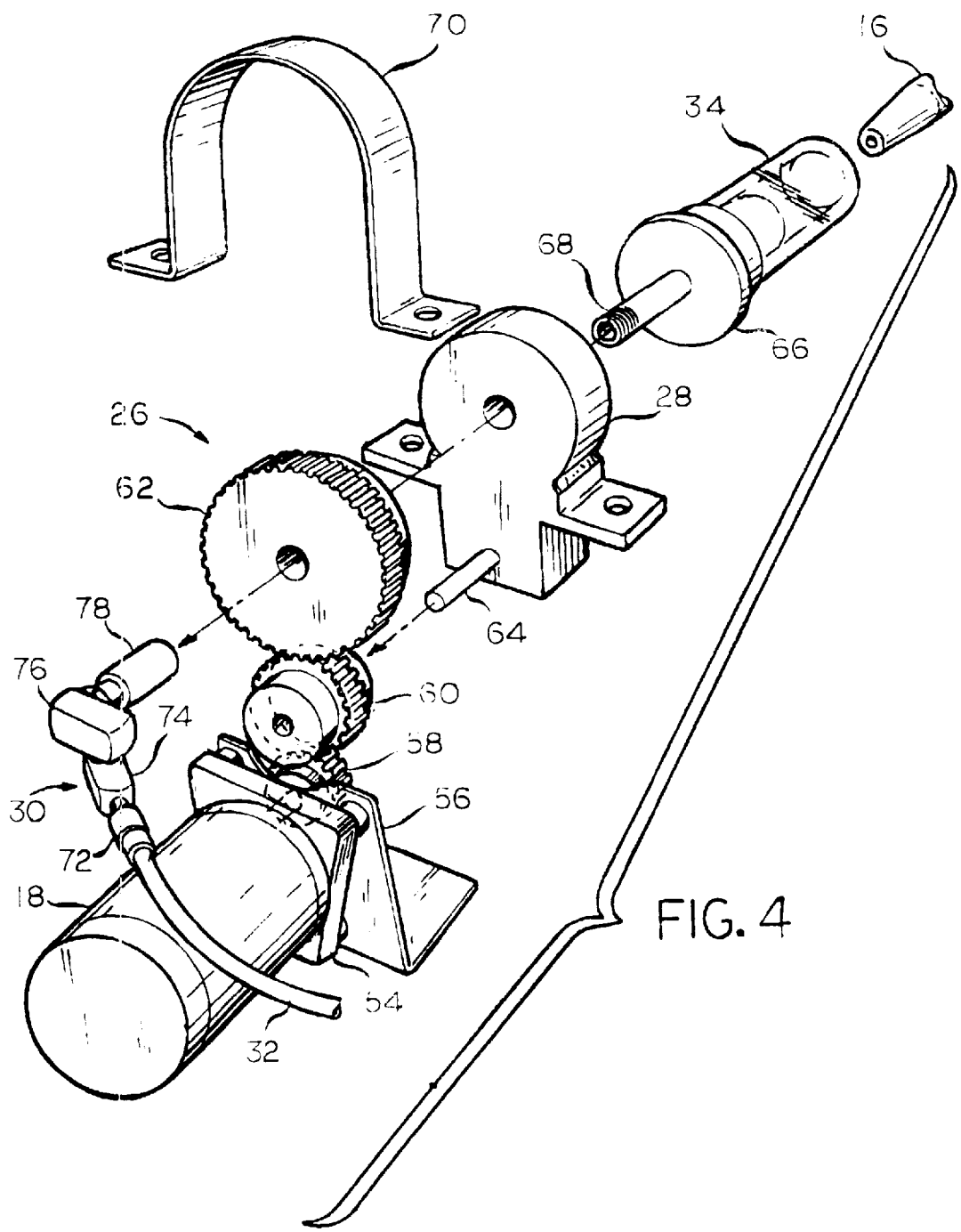
FIG. 4 shows an exploded view of the motor, gear assembly and air coupling assembly according to the preferred embodiment of the invention.

FIG. 4 shows a more detailed view of the motor 18, gear assembly 26, gear support 28, air coupling assembly 30, blow hose 32 and air tube 34 according to the preferred embodiment of the invention.

The motor 18 according to the preferred embodiment of the invention may be mounted on the lower section 12 of the lathe 10 using means well-known in the art, such as using a plate 54 mounted to a bracket 56. An important feature of the invention is that the motor 18 is capable of rotating the blowpipe 16 at a sufficient speed of rotation with a sufficient amount of torque to enable the glassmaker to form articles having designs requiring a high speeds of rotation and using tools requiring a large amount of torque. In the preferred embodiment, the motor 18 comprises a permanent magnet, parallel shaft gear motor of a type well-known in the art, such as a model type 4Z539A manufactured by Dayton available from Graingers as Part No. 4Z539, with the following parameters:

Rotational speed: 102 RPM,

Full-load torque: 13 in.-lb.,

Armature volts: 90 DC,

Full-load amps: 0.42 amps,

Gear ratio: 31:1,

Overhung Load lbs: 50, and

Maximum ambient operating temperature: 40° C.

It should be appreciated that the invention is not limited to the motor described above, and that the invention can be practiced using other rotating means having sufficient speed and torque for rotating the gear assembly, such as an engine, machine, instrument, device, dynamo, servo motor and the like.

The gear assembly 26 according to the preferred embodiment of the invention comprises a plurality of gears 58, 60, 62. The gear assembly 26 performs at least two important functions. First, the gear assembly 26 rotates the blowpipe 16 at a sufficient torque allowing the glassmaker to use tools to form the article. Second, the gear assembly 26 allows for air to be blown through the air coupling assembly 30 and into the blowpipe 16 to form the article while the article is being rotated at a sufficient speed and torque.

The first gear 58 of the gear assembly 26 comprises a spur gear, such as a type manufactured by Boston as Model NB24B available from Grainger as Part No. 1L959, coupled to the output shaft of the motor. In the preferred embodiment, the first gear 58 has the following parameters:

Diameter: 1.5 inch,

Pitch: 16,

Face width: 0.500 inch,

No. of teeth: 24,

Pitch Diameter: 1.500 inch,

Bore: 0.500 inch,

Outside Diameter: 1.625 inch,

Over Length: 0.750 inch,

Hub Diameter: 1.19 inch, and

Hub projection: 0.44 inch.

The second gear 60 of the gear assembly 26 frictionally engages the first gear 58. Preferably, the second gear 60 comprises a spur gear of the same type and model as the first gear 58 of the gear assembly 26.

The third gear 62 of the gear assembly 26 frictionally engages the second gear 60. Preferably, the third gear 62 comprises a spur gear, such as a type manufactured as Boston Model NB32 available from Grainger as Part No. 1L961. In the preferred embodiment, the third gear 62 has the following parameters:

Diameter: 2 inch,

Pitch: 16,

Face width: 0.500 inch,

No. of teeth: 32,

Pitch Diameter: 2.000 inch,
Bore: 0.500 inch,
Outside Diameter: 2.125 inch,
Over Length: 1.000 inch,
Hub Diameter: 1.69 inch, and
Hub projection: 0.50 inch.

Although the gear assembly 26 of the preferred embodiment of the invention comprises a plurality of gears 58, 60, 62, it should be appreciated that the invention is not limited to the number of gears or the type of gears described above. Thus, the invention may be practiced using gear arrangements having a different number of gears. In addition, the spur gear may be replaced by any other gear means, such as a mechanical transmission, sprocket, cogwheel, lantern-wheel and the like.

The preferred embodiment includes a gear support 28 for supporting the gear assembly 26. The gear support 28 is mounted to the lower section 12 of the lathe 10 using means well-known in the art, such as bolts or screws. The gear support 28 includes a pinion 64 that inserts into the central axis of the second gear 60 of the gear assembly 26. In this manner, the second gear 60 is rigidly attached to the gear support 28 and to the upper section 14 of the lathe 10.

The preferred embodiment also includes an output coupling 66 for rigidly attaching the third gear 62 to the gear support 28. The output coupling 66 includes an opening 68 for allowing air to flow between the air coupling assembly 30 and the blowpipe 16. The output coupling 66 also includes a threaded portion for fixedly attaching the output coupling 66 to the air coupling assembly 30. In addition, a gear cover 70 may be included to cover and protect the gear assembly 26. The gear cover 70 may be fixedly attached to the upper section 14 of the lathe 10 using means well-known in the art.

In the preferred embodiment, the air coupling assembly 30 comprises a male quick connect 72 and a plurality of pneumatic couplings 74, 76, 78. The quick connect 72 includes an input end connected to the blow hose 32 and an output end rotatably connected to a first coupling 74. The plurality of couplings 74, 76, 78 may be of a well-known type as described in U.S. Pat. Nos. D295,552, D295,553 and D317,818, herein incorporated by reference. The first coupling 74 is also rotatably connected to a second coupling 76 that is rotatably connected to a third coupling 78. In this manner, the blow hose 32 is capable of many degrees of freedom and allows the glassblower to position the blow hose 32 at an appropriate position while working on the article. The third coupling 78 is inserted into the central axis of the third gear 62 of the gear assembly 26 and connected to the output coupling 66 such that rotation of the third gear 62 causes the third coupling 78 and output coupling 66 to rotate. Likewise, the output coupling 66 connected to the air tube 34 causes the air tube 34 to rotate.

In the preferred embodiment, the air tube 34, preferably made of rubber or like material, has a cylindrical shape with an inside diameter slightly smaller than the end of the blowpipe 16 to allow the air tube 34 to frictionally engage the blowpipe 16 when the blowpipe 16 is inserted into the air tube 34. To facilitate insertion of the blowpipe 16 into the air tube 34, the end of the blowpipe 16 may be tapered. In this manner, the air coupling assembly 30 allows air from the glassmaker to pass through the blow hose 32, through the air coupling assembly 30, through the gear assembly 26 and into the blowpipe 16 to form the article while the blowpipe is being rotated by the motor 18.

It should be appreciated that the inside diameter of the air tube 34 may be of any diameter in order to frictionally engage the end of the blowpipe 16. Thus, the invention may be practiced with air tubes of varying diameters to accommodate blowpipes of various sizes.

Referring now to FIGS. 1–3, the preferred embodiment of the invention may include a plurality of toggle switches 80, 82, 84, 86 to perform various functions. The toggle switches 80, 82, 84, 86 may be of any type well-known in the art. For example, a single pole, single throw toggle switch 80, for example, a Carlings Model No. 2FB54-73 available from Graingers as Part No. 2X464, may be included to automatically supply cooling fluid to the sprinkler system 38 as described below. Another single pole, single throw toggle switch 82 may be included to manually cause a continuous supply of cooling fluid to the sprinkler system 38. In addition, a single-pole, double throw toggle switch 84, for example, a Carlings Model No. 2FB54-73 available from Graingers as Part No. 2X465, may be included to manually provide electrical power to the motor 18 or to remotely control the supply of electrical energy to the motor 18 through the use of a foot pedal 88 as described below. In addition, a double pole, double throw toggle switch 86, for example, a Carlings Model No. 2FB54-73 available from Graingers as Part No. 2X468, may be included to manually select between a forward or reverse direction of rotation of the motor 18. It should be understood that the invention is not limited by the type and number of switches and that the invention can be practiced with any type or number of switches.

The preferred embodiment of the invention may also include a controller 90 mounted to the upper section 14 for manually controlling the speed of rotation of the motor 18. Preferably, the controller 90 comprises a rheostat of a type well-known in the art, such as a type available from Graingers as Part No. 6A191 with the following parameters:

Input volts: 115 volts,
HP Range: $\frac{1}{35}-\frac{1}{6}$,
Armature volts: 90,
Constant Torque Speed Range: 15:1, and
Speed Regulation: 10–30%.

The preferred embodiment of the invention may also include a foot pedal 88 for remotely controlling the speed of rotation of the motor 18. The foot pedal 88 is electrically connected to the upper section 14 of the lathe 10, preferably using a three-prong plug 92. Once connected to the upper section 14 of the lathe 10, the glassblower may then remotely control the speed of rotation of the motor 18 by depressing the pad on the foot pedal 88 to increase the speed of rotation of the motor 18. Similarly, the glassblower may decrease the speed of rotation of the motor by allowing the pad on the foot pedal 88 to rise. In this manner, the glassblower may remotely control the speed of rotation of the motor 18 while allowing the glassmaker's hands to be free, thus enabling the glassmaker the ability to use tools while the blowpipe 16 is being rotated by the motor 18.

At least one roller assembly 36 rotatably supports the blowpipe 16 on the upper section 14 of the lathe 10. In addition, the roller assembly 36 maintains the blowpipe 16 at the proper elevation such that the blowpipe 16 is in a substantially horizontal position with respect to the lathe 10. Preferably, a roller assembly 36 is mounted to the upper section of the lathe 10 at a location approximately in the middle of the upper section and another roller assembly 36 is mounted at an end opposite from the gear assembly 26 to provide at least three locations for supporting the blowpipe 16. It should be appreciated that the invention is not limited by the number of roller assemblies and that the invention may be practiced with any number and location of roller assemblies.

In the preferred embodiment, the roller assembly 36 comprises a ball bearing 94, preferably made of steel or like material, rotatably mounted in a socket 96. The ball bearing 94 and socket 96 are slidably mounted to a frame 98 at a predetermined angle of approximately 45° with respect to the frame 98 using means well-known in the art. It should be appreciated that each ball bearing 94 is freely rotatable within the socket 96 to allow the blowpipe 16 to also freely rotate when supported by the bearing assembly 36. The elevation of the ball bearing 94 and the socket 96 may be adjusted by adjustment screws 100 located in the frame 98. In this manner, the glassmaker can adjust the elevation of the blowpipe 16 to ensure that the blowpipe 16 is supported at a substantially horizontal position with respect to the lathe 10.

The preferred embodiment of the invention also includes a sprinkler system 38 as a means for cooling the blowpipe 16. One advantage of providing cooling fluid to the blowpipe 16 with the sprinkler system 38 is that it enables the glassmaker to form the article while the article is at the proper temperature without the need to remove the article from the lathe 10 in order to cool the article. This allows the glassmaker to continuously form the article, thereby increasing the efficiency of the glassmaker.

The sprinkler system 38 includes a plurality of openings 102 for allowing the cooling fluid to spray upward towards the blowpipe 102. The openings 102 have a diameter of approximately 0.1 inch. The diameter of the openings 102 and the pressure of the fluid from the pump 24 causes the fluid to spray upwards at the appropriate height. A guard 104 may be provided to prevent the cooling fluid from splashing on the glassmaker or on other undesirable areas. The preferred embodiment also includes a sink 106 having at least one drain hole (not shown) for allowing the cooling fluid to return to the reservoir 48 in the lower section 12 of the lathe 10. A supply hose 108 provides fluid communication from the pump 24 to the sprinkler system 38. Preferably, the pump 24 is self-priming by means of an inlet hose 110 being disposed within the reservoir 48 in the lower section 12 of the lathe 10.

The sprinkler system 38 may be activated by means of the switch 40 mounted to the upper section 14 of the lathe 10. In the preferred embodiment, the switch 40 may be of any well-known type, such as a type manufactured by Omron as Model Z15GW2-B7-K available from Grainer as Part No. 6X285 and comprises a snap-action switch having a roller type of actuator to allow the blowpipe 16 to freely rotate on the lathe 10. Preferably, the switch 40 is positioned on the upper section 14 of the lathe 10 at an elevation such that the switch 40 is depressed by the blowpipe 16 when the blowpipe is supported by the roller assembly 36. When depressed, the switch 40 allows the flow of electrical energy to the pump 24 in order to provide cooling fluid to the sprinkler system 38. Similarly, the switch 40 prevents the flow of electrical energy to the pump 24 when the switch 40 is no longer depressed by the blowpipe 16. In this manner, the switch 40 provides a means for automatically providing cooling fluid to the blowpipe 16. As mentioned earlier, the toggle switch 80 may enable or disable the switch 40 to automatically provide cooling fluid to the blowpipe 16.

In summary, the invention provides a lathe for blowing glass that increases the efficiency of the glassmaker by allowing the glassmaker to form the article without the need to cool the article by removing the article from the lathe. Further, the invention reduces the manpower necessary to form the article by allowing the glassmaker's hands to be remain free to use tools while the article is being rotated by the lathe. Finally, the invention also enables the glassmaker to create an article with a design that requires a high speed of rotation.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. An apparatus for rotating a blowpipe while blowing a glass article, comprising:
   a lower section;
   an upper section removably attached to said lower section;
   a motor mounted on said lower section, said motor having an output shaft;
   a gear assembly mounted on said upper section and operably connected to the output shaft of said motor;
   at least one roller assembly mounted on said upper section for rotatably supporting a blowpipe;
   an air coupling assembly having an input and an output, said air coupling assembly rotatably attached to said gear assembly;
   an air tube connected to the output of said air coupling assembly, said air tube frictionally engaging the blowpipe; and
   a blowhose connected to the input of said air coupling assembly,
   wherein said apparatus is capable of rotating the blowpipe while blowing the glass article.

2. The apparatus according to claim 1, further comprising a reservoir located in said lower section for containing cooling fluid and a pump mounted in said reservoir capable of being in fluid communication with the cooling fluid.

3. The apparatus according to claim 2, further comprising a sprinkler system in fluid communication with said pump, said sprinkler system including a plurality of outlets for supplying cooling fluid to the blowpipe.

4. The apparatus according to claim 1, further comprising a controller operably connected to said motor for manually controlling a speed of rotation of said motor.

5. The apparatus according to claim 4, wherein said controller comprises a rheostat.

6. The apparatus according to claim 1, further comprising a switch mounted on said upper section of said apparatus, said switch operably connected to said motor for activating said motor when the blowpipe is positioned on said at least one roller assembly.

7. The apparatus according to claim 1, further comprising a remote control unit operably connected to said motor for remotely controlling a speed of rotation of said motor.

8. The apparatus according to claim 7, wherein said remote control unit comprises a foot pedal.

9. The apparatus according to claim 1, wherein said gear assembly comprises at least a first gear, a second gear and a third gear, the first gear operably connected to the output shaft of said motor, the second gear frictionally engaging the first gear, and the third gear frictionally engaging the second gear and operably connected to the blowpipe such that rotation of said motor causes rotation of the blowpipe.

10. A lathe for rotating a blowpipe, comprising:
    a housing;
    a motor disposed within said housing, said motor having an output shaft;

a gear assembly operably connected to the output shaft of said motor;

an air coupling assembly rotatably attached to said gear assembly;

a blowhose connected to an input of said air coupling assembly; and an air tube connected to an output of said air coupling assembly for frictionally engaging the blowpipe, wherein said lathe is capable of rotating the blowpipe while air is being provided to the blowpipe.

11. The lathe according to claim 10, further comprising at least one roller assembly mounted on said housing for supporting the blowpipe.

12. The lathe according to claim 10, further comprising a pump in fluid communication with a sprinkler system for cooling the blowpipe.

13. The lathe according to claim 12, further comprising a switch for automatically activating said pump.

14. The lathe according to claim 10, further comprising a controller for controlling a speed of said motor.

15. The lathe according to claim 10, further comprising a switch for selecting a direction of rotation of said motor.

16. The lathe according to claim 10, further comprising means for remotely controlling a speed of said motor.

17. A lathe for rotating a blowpipe, comprising:

means for supporting a blowpipe;

means for rotating the blowpipe;

means for providing air to the blowpipe; and means for cooling the blowpipe.

18. The lathe according to claim 17, further comprising means for controlling a speed of rotation of said rotating means.

19. The lathe according to claim 18, further comprising means for selecting a direction of rotation of said rotating means.

20. A portable lathe for blowing glass, comprising:

a motor having an output shaft;

a gear assembly operably connected to the output shaft of said motor;

an air coupling assembly operably connected to said gear assembly;

a blowhose operably connected to an input of said air coupling assembly; and a blowpipe operably connected to an output of said air coupling assembly, wherein said lathe is capable of rotating said blowpipe while air is being provided to said blowpipe.

21. The lathe according to claim 20, further comprising a sprinkler system for providing cooling fluid to said blowpipe.

22. The lathe according to claim 20, further comprising a controller operably connected to said motor for controlling a speed of rotation of said motor.

23. The lathe according to claim 20, further comprising a switch for selecting a direction of rotation of said motor.

* * * * *